United States Patent
Manikkathiagarajah et al.

(10) Patent No.: US 9,150,438 B2
(45) Date of Patent: Oct. 6, 2015

(54) ELECTROLYTIC CELL

(75) Inventors: Hilary Nath Dilrukshan Manikkathiagarajah, Hamilton (NZ); Alan George Langdon, Hamilton (NZ)

(73) Assignee: WAIKATOLINK LIMITED, Hamilton (NZ)

( * ) Notice: Subject to any disclaimer, the term of this patent is extended or adjusted under 35 U.S.C. 154(b) by 113 days.

(21) Appl. No.: 13/995,135

(22) PCT Filed: Dec. 15, 2011

(86) PCT No.: PCT/NZ2011/000261
§ 371 (c)(1),
(2), (4) Date: Oct. 21, 2013

(87) PCT Pub. No.: WO2012/081999
PCT Pub. Date: Jun. 21, 2012

(65) Prior Publication Data
US 2014/0027307 A1    Jan. 30, 2014

(30) Foreign Application Priority Data
Dec. 17, 2010    (NZ) ........................................ 590016

(51) Int. Cl.
*C02F 1/46*    (2006.01)
*C02F 1/467*   (2006.01)
(Continued)

(52) U.S. Cl.
CPC ........... *C02F 1/4674* (2013.01); *C02F 1/46109* (2013.01); *C25B 9/06* (2013.01); *C25B 11/03* (2013.01); *C02F 2001/46157* (2013.01); *C02F 2101/308* (2013.01)

(58) Field of Classification Search
USPC .......................................... 205/758; 204/242
See application file for complete search history.

(56) References Cited

U.S. PATENT DOCUMENTS 5,674,365 A    10/1997  Sano
5,897,757 A *   4/1999  Sano ............................. 204/284
(Continued)

FOREIGN PATENT DOCUMENTS

EP    1118585 A2    7/2001
NZ    217989        8/1989
WO    WO 02/098799 A1    12/2002

OTHER PUBLICATIONS

Nath, H. et al; 2010: "Electrochemical decontamination of Iron and manganese from groundwater. Australian National Groundwater" PowerPoint Presentation given at Groundwater 2010 Conference at the National Convention Centre, Canberra, Australia, Nov. 4, 2010.
(Continued)

*Primary Examiner* — Arun S Phasge
(74) *Attorney, Agent, or Firm* — Knobbe, Martens, Olson & Bear, LLP

(57) ABSTRACT

The present invention relates to an electrolytic cell, including: at least two electrodes, each electrode including: a first and a second surface; and a number of perforations arranged in a substantially uniform pattern; wherein the electrodes are positioned relative to each other such that: at least one surface of each electrode is opposed to a surface of the other electrode, and a gap is formed between the opposed surfaces of the electrodes; wherein the cell includes at least one electrically insulating layer positioned on the opposing surface of at least one electrode, the insulating layer including a number of perforations aligning with the perforations of the electrode on which it is positioned.

22 Claims, 14 Drawing Sheets

(51) Int. Cl.
*C02F 1/461* (2006.01)
*C25B 9/06* (2006.01)
*C25B 11/03* (2006.01)
*C02F 101/30* (2006.01)

(56) References Cited

U.S. PATENT DOCUMENTS 6,019,031 A      2/2000   Qin et al.
6,296,756 B1    10/2001   Hough et al.
6,328,875 B1 *  12/2001   Zappi et al. ............ 205/500
7,824,537 B2    11/2010   Christensen et al.
2008/0073288 A1  3/2008   Fan et al.
2008/0099406 A1  5/2008   Ruan et al.

OTHER PUBLICATIONS

Nath, H. et al; 2010: "A novel perforated electrode flow through cell design for chlorine generation", *Journal of Applied Electrochemistry*, 41(4), 389-395.

Yang, J. et al; 2006: "A novel preparation method for $NiCo_2O_4$ electrodes stacked with hexagonal nanosheets for water electrolysis" *Journal of Applied Electrochemistry* 36: 945-950.

* cited by examiner

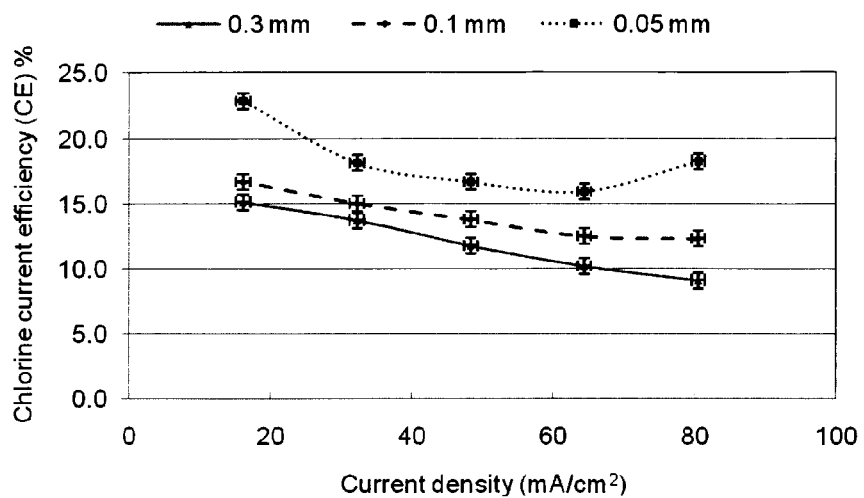
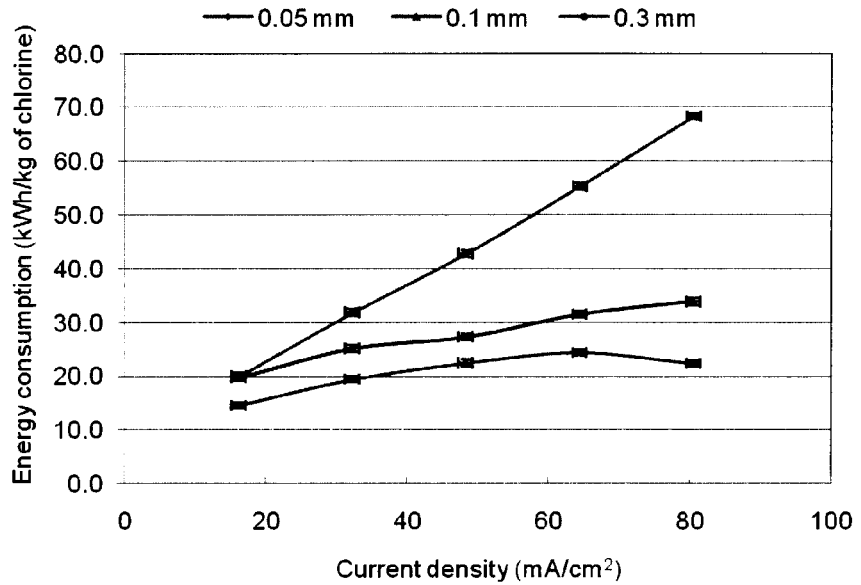
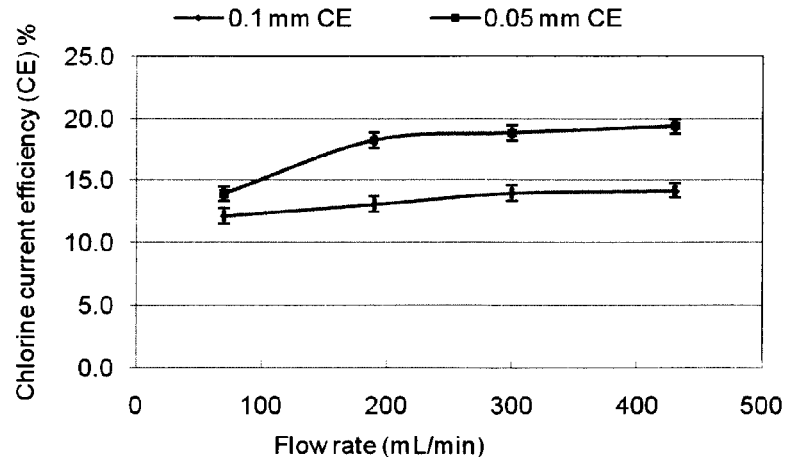

ELECTROLYTIC CELL

STATEMENT OF CORRESPONDING APPLICATIONS

This application is based on the Provisional specification filed in relation to New Zealand Patent Application Number 590016, the entire contents of which are incorporated herein by reference.

TECHNICAL FIELD

The present invention relates to an electrolytic cell, and a method of electrolytic treatment.

BACKGROUND ART

Electrochemical oxidation of solutes in water can occur through two different oxidation mechanisms—direct oxidation and indirect oxidation. Direct oxidation involves two steps: (1) diffusion of solutes from the bulk solution to the anode surface and (2) oxidation of solutes at the anode surface. During indirect electrochemical oxidation, a strong oxidizing agent is electrochemically generated at the anode surface and oxidizes the target solutes. The indirect oxidation mechanism is more favourable in processes involving dilute solutions and is used frequently in the water treatment applications.

The electrolytic generation of chlorine species has particular advantages in the disinfection of drinking water, the principal one being that onsite generation of the chlorine eliminates the transport, handling and the storage of dangerous chlorine gas or the hazardous concentrated hypochlorite. The electro-generation of chlorine process is safe, environmentally friendly, easily operated and known to inactivate a wide range of micro-organisms ranging from bacteria to viruses and algae, the primary function of a disinfectant. Chlorine remains a predominant method for disinfecting drinking water as it provides both the primary and secondary functions despite the disadvantages of unfavourable taste and odour and the generation of potentially toxic chlorinated organic chlorination by-products. Alternative processes developed to overcome these disadvantages generally do not meet the secondary function of providing a residual protection in the distribution system. Active chlorine is traditionally introduced to water in the form of hypochlorite or chlorine gas. More recently electrochemical generation of hypochlorite has been advocated.

While electrochemical techniques offer attractive possibilities for a variety of treatments of water and wastewater, including electro-chlorination and electro-oxidation as well as electrolytic stripping and recovery of metals, they are generally too inefficient to be economically viable—particularly because of the high cost of electrodes, high voltages and high power consumption.

At low concentrations the rate of desired electrode reaction is limited by the rate at which the electro active species can diffuse to the electrode. In aqueous solutions, the predominant competing reaction at the electrodes will be electrolysis involving either $H^+$ or $OH^-$ ions which will be maintained at constant concentration by the dissociation of water.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to an embodiment of the present invention there is provided an electrolytic cell, including:
  at least two electrodes, each electrode including:
    a first and a second surface; and
    a number of perforations;
  wherein the electrodes are positioned relative to each other such that:
    at least one surface of each electrode is opposed to a surface of the other electrode, and
    a gap is formed between the opposed surfaces of the electrodes;
  wherein the cell includes at least one insulating layer positioned on the opposing surface of at least one electrode, the insulating layer including a number of perforations aligning with the perforations of the electrode on which it is positioned.

According to an embodiment of the present invention there is provided a method of treating fluid using an electrolytic cell, the cell including at least two electrodes, each electrode including a first and a second surface and a number of perforations, wherein the electrodes are positioned relative to each other such that at least one surface of each electrode is opposed to a surface of the other electrode and a gap is formed between the opposed surfaces of the electrodes, wherein the cell includes at least one insulating layer positioned on the opposing surface of at least one of the electrodes, the insulating layer including a number of perforations aligning with the perforations of the electrode on which it is positioned, wherein the method includes the steps of:
  i) passing the fluid through the perforations in one of the electrodes, into the gap, and through the perforations in the other electrode; and
  ii) applying an electric current to the electrodes as the fluid passes through the cell.

In a preferred embodiment the gap is between substantially 1 to 100 micrometers. More preferably the gap is between 2 to 4 micrometers.

It should be appreciated that this is not intended to be limiting, and that the gap may be optimised depending on factors such as the materials used to construct the cell, thickness of the insulating layer, the target electroactive species, or the desired flow rate of fluid through the cell—as evidenced by the discussion in the following sections. Spacers may be used to maintain the gap as desired.

It is envisaged that the space between the conducting electrode surfaces not filled by the insulating film may be adjusted in order to maximise power efficiency. Further, hydrodynamics may be improved by reduced electrical or hydrodynamic resistance when positioning spacers between the electrodes to define the inter-electrode gap, in combination with the use of an insulating layer on the surface of one of the electrodes.

Preferably the insulating layer is impervious to water and electroactive species.

It is envisaged that this may be achieved by applying polyurethane varnish to the electrode. However it should be appreciated that this is not intended to be limiting, as the insulating layer may be made of any suitable material known to a person skilled in the art. For example, the insulating layer may be a composite film, an organic film, an inorganic film or deposit, or an adhesive strip. The material of the insulating layer may be selected based on an electroactive species to be targeted. It is envisaged that active sites on the film may be used to pre-concentrate the electrode active species.

While it is envisaged that the insulating layer may preferably be adhered to or bonded with the electrode surface, alternative arrangements are anticipated whereby the insulation is held in place on the surface of the electrode by mechanical means.

Preferably the insulating layer does not extend into the perforations of the electrode on which it is positioned.

In a preferred embodiment the insulating layer is substantially one to ninety nine percent of the space between the conducting electrode surfaces in thickness.

Preferably the cell is configured such that flow of liquid through the cell is such that the desired electrolytic product species are formed at the electrode from which the fluid exits the cell.

In a cell configured for use in the production of chlorine, it is envisaged that the insulating layer may be applied to the anode.

It should be appreciated that selection of the electrode to include the insulating layer may depend on the charge of the electroactive species—i.e. whether an electrode is to act as an anode or a cathode. Similarly, the electroactive species of interest may be either the cation or anion of a dilute electrolyte solution.

In a preferred embodiment the cell may include a housing configured to direct a flow of fluid through the electrodes. In particular, it is envisaged that the cell may configured to direct the flow through the cathode and then anode. The housing may also be configured to encapsulate the electrodes and seal the cell with the exception of at least one inlet and outlet to enable flow of fluid through the cell.

In an example wherein the electrolytic product species is chlorine, one of the electrodes is configured to act as a cathode, the other electrode is configured to act as an anode, preferably the fluid is first passed through the cathode.

Preferably the perforations of each electrode are positioned such that they are offset relative to the perforations of the other electrode.

Preferably the perforations of each electrode are arranged in a regular pattern such that uniform flow paths are formed between the perforations of one electrode, and the perforations of the other electrode. Preferably these flow paths are optimised to provide a minimum flow path length.

According to another aspect of the present invention there is provided an electrolytic cell, including:
- at least two electrodes, each having a first and a second surface, wherein the electrodes are positioned relative to each other such that:
  - at least one surface of each electrode is opposed to a surface of the other electrode, and
  - a gap is formed between the opposed surfaces of the electrodes;
- wherein each electrode includes a number of perforations, the perforations of each electrode positioned such that they are offset relative to the perforations of the other electrode.

According to another aspect of the present invention there is provided an electrolytic cell, including:
- at least two electrodes, each having a first and a second surface, wherein the electrodes are positioned relative to each other such that:
  - at least one surface of each electrode is opposed to a surface of the other electrode, and
  - a gap is formed between the opposed surfaces of the electrodes;
- wherein each electrode includes a number of perforations, the perforations of each electrode arranged in a regular pattern such that uniform flow paths are formed between the perforations of one electrode, and the perforations of the other electrode.

In a preferred embodiment the perforations are arranged in a hexagonal array on each electrode.

In one embodiment, it is envisaged that the density of perforations in one electrode is greater that the density of perforations in the other electrode. Preferably the distance between the perforations in the electrode having the lower density of perforations is substantially 1.75 times the distance between the perforations in the other electrode.

It should be appreciated that the pattern is not intended to be limited to a hexagonal array. For example, the perforations may be arranged in a square array.

Preferably each perforation is substantially 1 millimeter in diameter. It should be appreciated that this is not intended to be limiting, and that other diameters are envisaged.

In a preferred embodiment the density of the perforations in each electrode may at least 6 perforations per square centimeter. However, this is not intended to be limiting and the density may be in the order of at least 3 perforations per square centimeter. It should be appreciated that the maximum perforation density will effectively be determined by the diameter of the perforations, although optimal density may be influenced by other factors such as the material of the electrode/insulating layer, or the electroactive species of interest.

The Applicants consider the present invention to have the following advantages over the prior art:
- small inter-electrode gap reduces resistance so the cell can be operated at low voltages and with low resistive power losses;
- perforated electrodes with staggered hexagonal or square arrays of perforations optimise current efficiency and minimise power consumption;
- perforated electrodes with aligned hexagonal or square arrays of perforations optimise hydrodynamic flow through the cell;
- insulation of a surface of an electrode minimises the potential for inadvertent short circuiting of the electrodes, and also has an electro-catalytic effect in the electrolysis of target ions of low concentrations improving selectivity over water electrolysis. Improved current efficiencies and reduced energy consumption are thus obtained;
- Completely sealed pressurizable PEFT cell assembly gives control over flow through the cell;
- the flow through configuration allows for easy coupling to inline treatment processes;
- treatment can be varied by controlled flow-rates, current densities and number of contact cycles. It is therefore programmable to the required level of product generation;
- ability to scale up or down to suit the capacity;

ease of operation. Convenient disinfection at the flick of a switch;

disinfection using natural levels of chloride. No chemical addition required;

oxidation of the reduced metal ions (e.g. Fe(II) and Mn(II)) occurring in natural waters or in industrial wastewaters;

colour removal of industrial effluents; and synergistic effects created by the electric field (electroporosis) enhancing the effectiveness of reactive chlorine species formed during electro-disinfection.

BRIEF DESCRIPTION OF THE DRAWINGS

Further aspects of the present invention will become apparent from the ensuing description which is given by way of example only and with reference to the accompanying drawings in which:

FIG. 4a is a graph showing chlorine current efficiency versus current density;

FIG. 4b is a graph showing energy consumption versus current density;

FIG. 4c is a graph showing chlorine current efficiency versus flow rate;

BEST MODES FOR CARRYING OUT THE INVENTION

Figure 1:
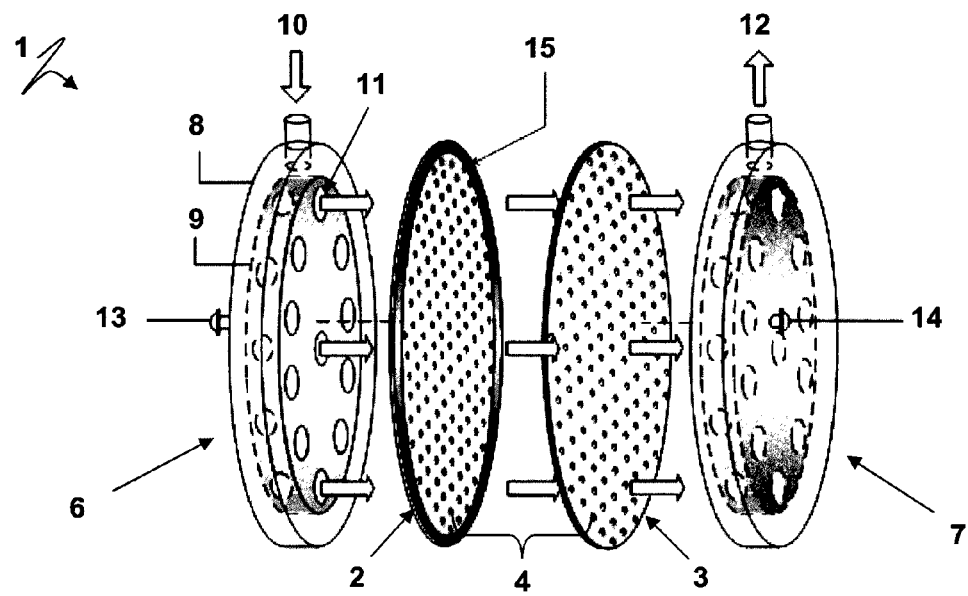
FIG. 1 is an exploded perspective view of an electrolytic cell according to one embodiment of the present invention.

FIG. 1 illustrates an electrolytic cell (generally indicated by arrow 1) according to one embodiment of the present invention, including a first electrode in the form of a stainless steel plate configured to act as a cathode (2), and a second electrode in the form of a graphite plate configured to act as an anode (3).

It should be appreciated that the materials for the electrodes may be selected based on the desired electrochemical product, or industry standards associated with the fluid to be treated or processed.

The cathode (2) and anode (3) each include a number of perforations (4) through which fluid can pass.

A gap between the cathode (2) and anode (3) was achieved by positioning a circular strip (15) of cellulose based adhesive tape having a thickness of approximately 50 microns around the perimeter of the cathode (2).

The cell (1) includes a first housing portion (6) and a second housing portion (7), both made of a plastic, such as polyvinyl chloride. Both housing portions (6, 7) include an outer casing (8) and an inner casing (9).

Fluid enters the outer casing (8) of the first housing portion (6) through a inlet (10), passes through into the inner casing (9) and is distributed across the face of the cathode (2) via a plurality of holes (11) in the inner casing (9).

It then passes through the cathode (2) and anode (3) into the inner casing of the second housing portion (7), and discharged via an outlet (12).

Negative (13) and positive (14) leads connect the cathode (2) and anode (3) respectively to a direct current source (not illustrated).

Perforation Pattern

The inventors have identified that uniform and shorter flow paths between the cathode (2) and anode (3) are desirable for effective treatment of the target fluid.

FIG. 1a illustrates a hexagonal pattern for the perforations (4) of the cathode (2) and electrode (3).

The perforations (4) of the cathode (2) and anode (3) are staggered between the electrodes. In doing so, the inventors have identified the effect of increasing the distance of the flow paths across the electrodes surfaces and hence the contact time.

Figure 2A:
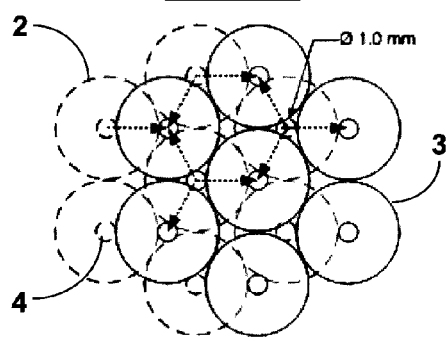
FIGS. 2a-c are illustrations of perforation patterns on electrodes in accordance with one embodiment of the present invention.
Figure 2B:
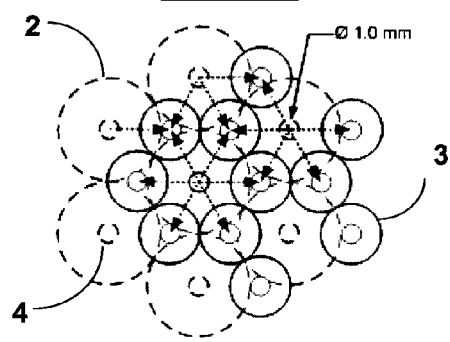

However, staggering the perforations (4) in a hexagonal pattern can leave potentially stagnant regions on the electrode surfaces. To achieve uniform flow patterns with the hexagonal perforation arrangement a modified hexagonal pattern was developed, as illustrated in FIG. 2b. The distance between the perforations of the cathode (2) is 'x' and the perforation to perforation distance of the anode (3) is taken to be 1.75x.

The perforations are positioned so that in a staggered configuration the central perforation of the lower density distribution on the anode (3) faces an undrilled central site of the higher site density distribution on the cathode (2). The inventors consider that this configuration gives the most uniform flow distribution over the electrodes with minimal stagnant regions.

Figure 2C:
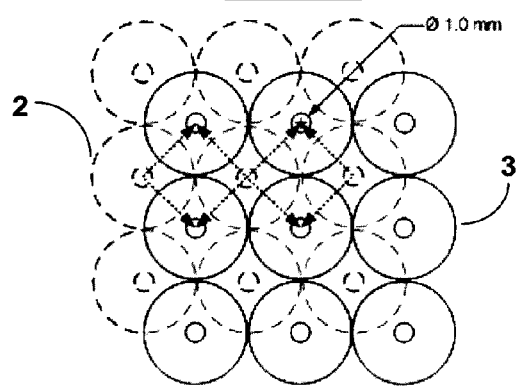

FIG. 2c illustrates a square pattern which also allows for uniform flow paths if the holes of the cathode (2) and anode (3) are arranged in a staggered configuration.

The inventors consider that the hexagonal arrangement allows the maximum possible perforation density—particularly in the working electrode i.e. the electrode at which the desired electrochemical transformation takes place.

In order to test the effect of key parameters on cell performance, studies of chlorine generation at a given chloride ion concentration of 0.1 mol/L NaCl, maintained at consistent pH 5.5 and conductivity of 6.2 mS/cm at 20° C. were performed.

It should be appreciated that the cell and the principles of operation of the present invention discussed herein are not limited to chlorine generation.

Perforation Density: Aligned Configuration

In order to test the effect of perforation density, two electrode systems with 3 and 6 holes/cm$^2$ respectively, in the hexagonal pattern were assembled. The cathode (2) and anode (3) were positioned such that the perforations in each electrode were aligned rather than staggered.

Figure 3A:
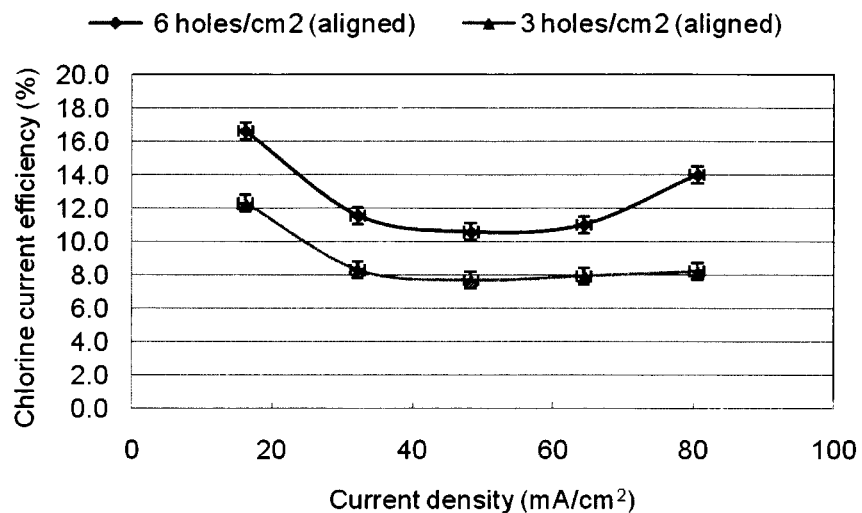
FIGS. 3a, c are graphs showing chlorine current efficiency versus current density.

With a flow rate of 190 mL/min, the chlorine generation was measured as a function of current density and the results are shown in FIG. 3a.

The results show that the higher hole density of 6 holes/cm$^2$ produced more chlorine than the low hole density. It may also be seen that the difference in the rate of production increased with increasing current density.

The inventors believe that the increased electrode area provided by the internal surfaces of the perforations more than compensated for the planner electrode area lost when the perforations were drilled.

The average current efficiency for the higher perforation density was 13%; 4% higher than the lower perforation density. The corresponding energy consumptions (EC) for the higher and lower perforation densities were 29 and 42 kWh/kg of chlorine respectively, a difference in EC of approximately 30%.

Figure 3B:
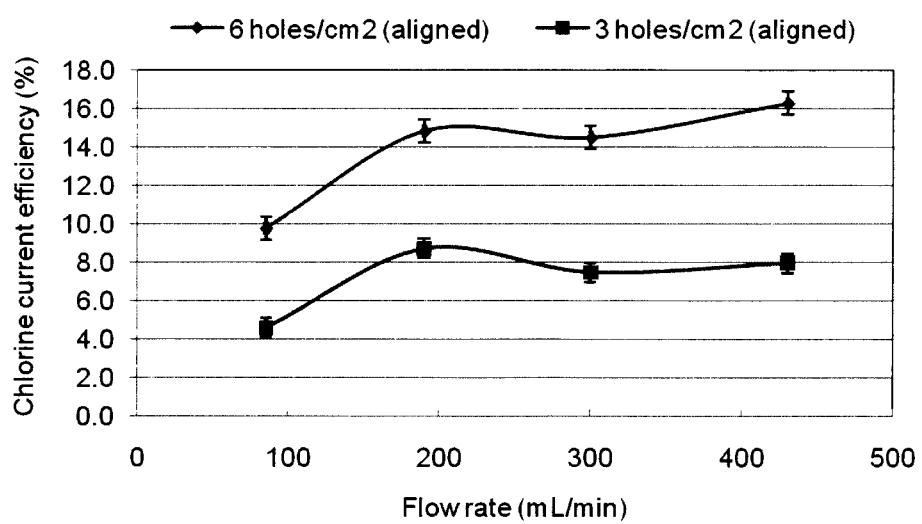
FIG. 3b, d are graphs showing chlorine current efficiency versus flow rate.

The effect of perforation density was also studied at increasing flow rates at constant current density (80 mA/cm$^2$). The results shown in FIG. 3b show that higher density of perforations generated more chlorine, and that the difference in yield was most significant at low flow rates. The inventors consider that this result is likely to be due largely to the reduction in the retention time in the cell at increased flow rates.

Perforation density is an important parameter in design of a flow through electrolytic cell in accordance with the present invention. The inventors consider that there will be a physical maximum perforation density depending on the area of the electrode and the diameter of the perforations.

Perforation Density: Staggered Configuration

In the aligned configuration discussed above, the centres of the perforations of the electrodes faced each other and the electrolyte moved through the cell with minimum deviation of flow path. In a staggered configuration, the centres of the perforations of one electrode were displaced to face the midpoint of the triangular array defined by the hexagonal perforation pattern (see FIG. 2a). Flow was now forced to sweep across the electrode surface.

Figure 3C:
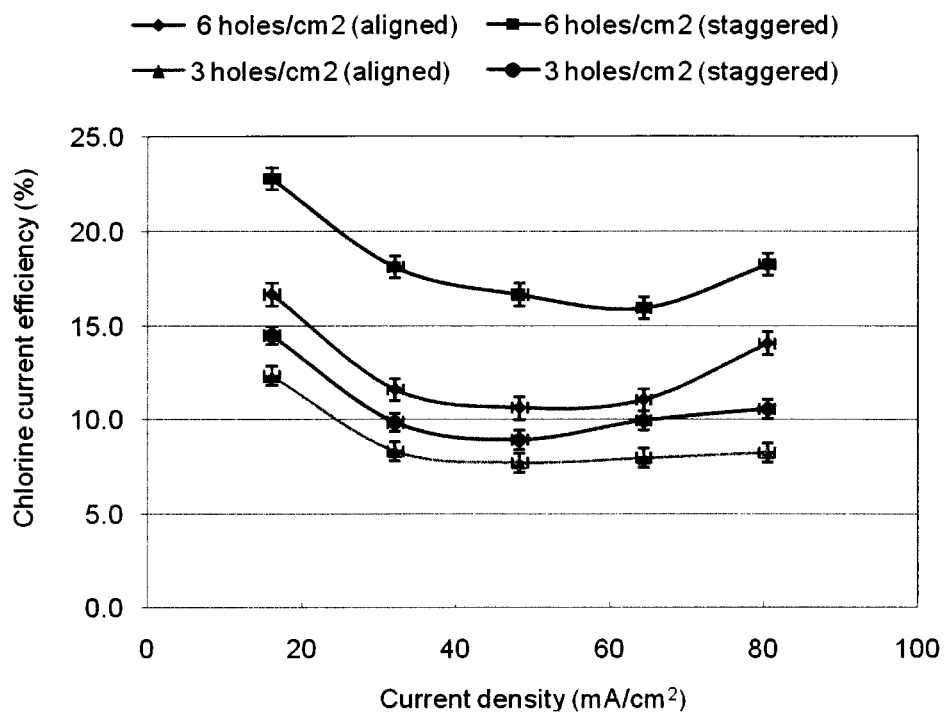

The same two perforation densities were employed to study the effect of the staggering. The results for the variation of chlorine generation with current density at constant flow rate of 190 mL/min are given in FIG. 3c.

It may be seen that initially for both perforation densities and both perforation configurations, the current efficiency decreased with current density. However the decrease was less for the staggered configuration.

The inventors consider that this effect can be understood by the hydrodynamic effects involved. In the aligned configuration the solution between the electrodes will remain largely stagnant and become depleted of chloride so that electrolysis of water predominates. In the staggered configuration the solution between the electrodes is continually replenished and the hydrodynamic boundary layer is minimised.

Higher current efficiency at higher perforation density can be explained in geometric terms. The effective electrode surface area is increased by the walls of the perforations so that the actual current density at the electrode surfaces is lower than the average current density based upon cell cross-section.

Figure 3D:
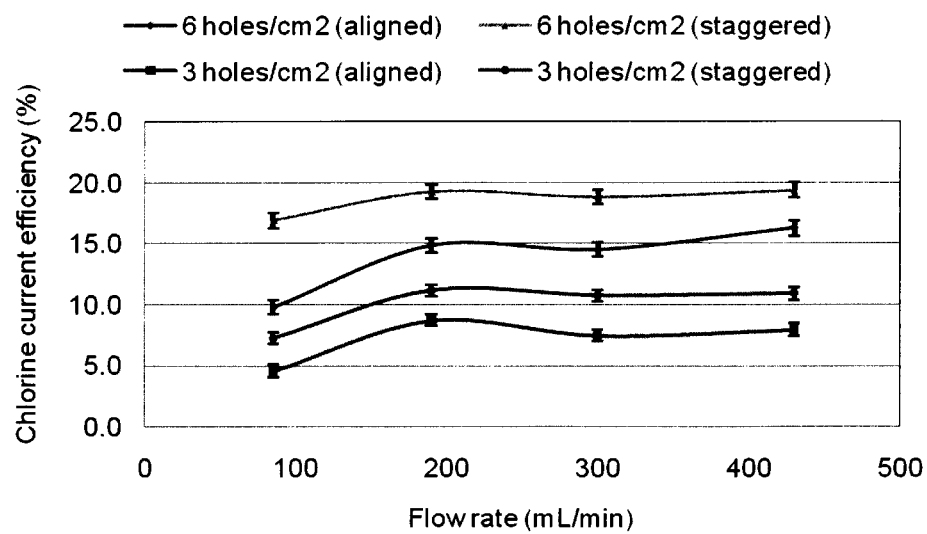

The effect of perforation configuration with flow rate is illustrated in FIG. 3d. For a given perforation density the yield doubled when the perforations were staggered. Comparing the aligned configuration at low perforation density with the staggered configuration at the higher perforation density, a fourfold increment in chlorine generation may be seen.

The average current efficiency (CE) at the higher perforation density for the staggered configuration was 18.34%, whereas for the aligned configuration it was 12.78%. This provided a percentage increment in the current efficiencies of 43.5%.

Comparing the energy consumptions corresponding to the above CE conditions the staggered configuration consumed 29.5% less energy per kilogram of chlorine generated.

Inter-electrode Gap

The inventors have identified the inter-electrode gap is a major contributor to efficiency of the electrolytic cell of the present invention.

Cells of inter-electrode gaps of 0.3, 0.1, and 0.05 mm were set up, with a flow rate 190 mL/min, 6 perforations/cm$^2$, and a staggered perforation configuration. The current efficiency for chlorine generation at constant chloride concentration and flow rate was studied as a function of current density and the results are given in FIG. 4a.

It may be seen that current efficiency increased with reduced inter-electrode gap. Current efficiencies are generally higher at the low current densities. The increase in current efficiency for the 0.05 mm gap at the highest current density is contrary to the general trend and may be due to artifacts caused by water electrolysis.

The effect of improved current efficiency is reflected in the energy consumption given in FIG. 4b. The reduction of the gap from 0.3 to 0.05 mm has reduced energy consumption at the highest current densities from approximately 70 to just above 20 kWh/kg of chlorine.

The effect of the inter-electrode gap was studied with increasing flow rates at 0.1 mm and 0.05 mm gaps, the results of which are shown in FIG. 4c.

It may be seen that the reduced inter-electrode gap increased the chlorine current efficiency. Increased flow rate gradually increased the current efficiencies for both inter-electrode gaps studied.

The inventors consider that the increase in chlorine current efficiencies at low inter-electrode gap can be directly attributed to the reduced internal resistance. The reduction in inter-electrode gap could change the hydrodynamic flow pattern between the electrodes moving from laminar to more turbulent flow which reduces the thickness of the hydrodynamic boundary layer allowing chloride ions to diffuse more rapidly to the anode surface.

An important feature of the present invention is the ability to increase the flow rate through the cell without sacrificing the current efficiencies and hence improving the energy consumptions.

Perforation Diameters

Figure 5A:
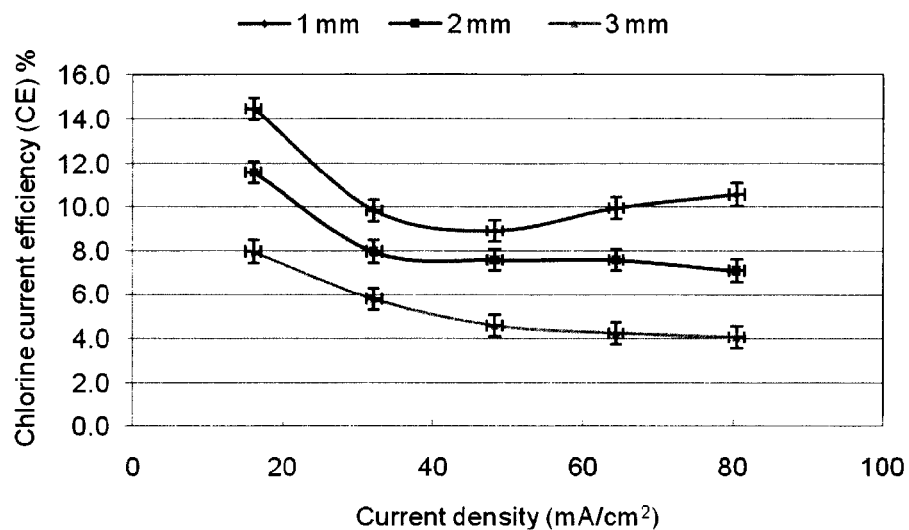
FIG. 5a is a graph showing chlorine current efficiency versus current density.

The effect of perforation diameter was studied using a perforation density of 3 perforations/cm$^2$ in the staggered configuration and perforation diameters of 1 mm, 2 mm, and 3 mm. The results of chlorine current efficiency with current density at constant flow rate of 190 mL/min are given in the FIG. 5a.

It may be seen that chlorine generation was most efficient with the smallest perforation size. Decreasing the perforation diameter resulted in progressive improvement in the current efficiency giving an approximately 50% improvement in current efficiency going from 3 mm to 1 mm. The downward trend of current efficiency with current density for the 2 and 3 mm perforation diameters is consistent with normal trends.

The inventors consider that a likely explanation for the improvement in current efficiency with reduced perforation size is the differing contribution of the perforation wall area to the overall electrode area. The area of the surface lost is given by $\pi r^2$ whereas area of wall gained by a perforation is circumference multiplied by the depth of perforation ($2\pi r \times d$). For a given active depth of a perforation area lost by drilling small perforations is more than compensated by the wall area gained so that effective electrode area is increased and effective current density decreased so that current efficiency is improved.

Figure 5B:
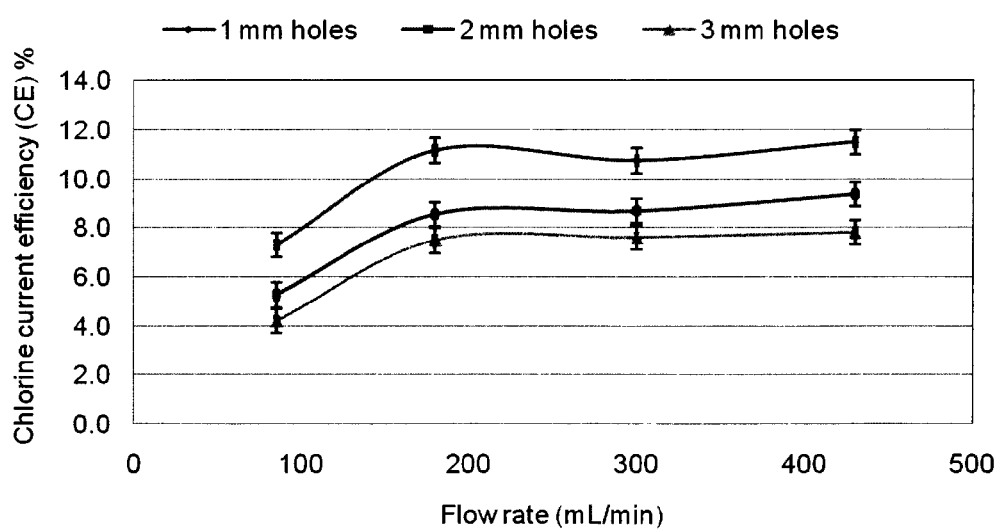
FIG. 5b is a graph showing chlorine current efficiency versus flow rate.

The effect on current efficiency of increasing perforation diameters at different flow rates is shown in FIG. 5b.

Two trends are apparent. Current efficiency increased as perforation size decreased and also increased with flow rate up to a flow rate of 200 mL/min. Above this flow rate current efficiency remained essentially constant. The former effect is consistent with the effect of current density on current efficiency described above which was attributed to the compensation of area lost by drilling small perforations by the wall area gained. The effect of flow rate is consistent with a reduction in the hydrodynamic boundary layer of the planner electrode surface as flow changes from laminar flow to turbulent flow above 200 mL/min.

Anode Perforation Diameter

Figure 6A:
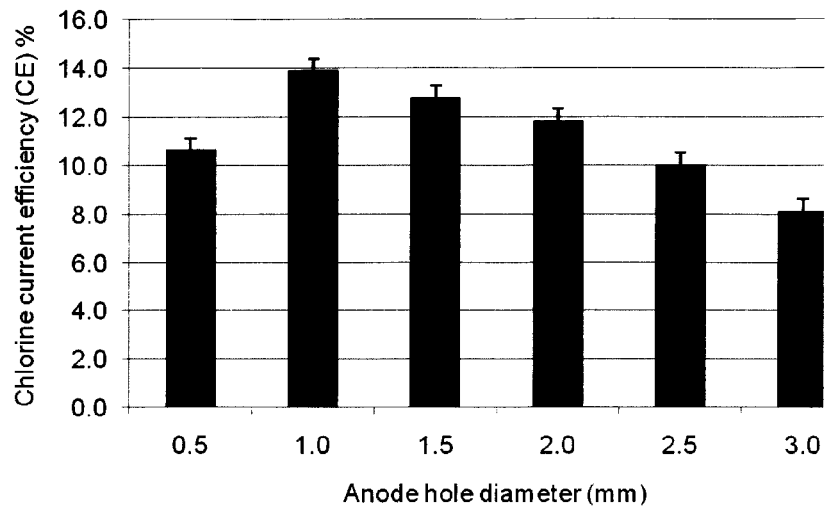
FIG. 6a is a graph showing chlorine current efficiency versus anode hole diameter.

Different size perforations provide a means of varying the active electrode area. The reaction of interest with chlorine generation occurred at the anode. The inventors investigated the effect of anode perforation diameter using the perforation density of 6 perforations/cm$^2$ and perforation sizes ranging from 0.5 to 3.0 mm diameters, at a flow rate of 70 mL/min. The results may be seen in FIG. 6a.

Figure 6B:
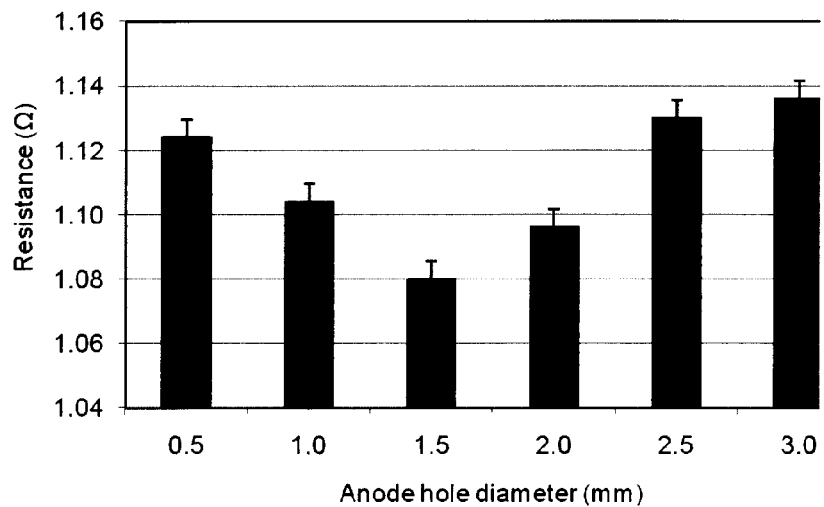
FIG. 6b is a graph showing resistance versus anode hole diameter.

The results show that current efficiency improved as perforation size decreased—consistent with the greater effective electrode area. This trend was reversed for perforation sizes below 1 mm. The inventors consider that a likely explanation for this reversal is polarization effects caused by less efficient sweeping of gas bubble accumulations on the planar regions of the anode surface. Such an accumulation of gas bubbles should lead to an increase in cell resistance. In order to test this possibility the resistance of the cell was measured as a function of perforation size. The results are summarised in FIG. 6b, at a flow rate of 190 mL/min.

The results indicate that the lowest resistance was at 1.5 mm anode perforation diameter. The increase in resistance below a 1.5 mm perforation diameter supports the argument that at low anode perforation diameters the narrow flow paths across the planar area of the electrodes resulted in less efficient sweeping of gas bubble accumulation.

The Cell Constant

The cell constant is defined by the equation:

$$k=l/A$$

It can be obtained by measuring the conductance of the cell (G) when filled with a solution of known conductivity (K) using the equation:

$$k=k*G$$

Alternatively the cell constant can be estimated geometrically from the equation k=l/A.

Figure 7:
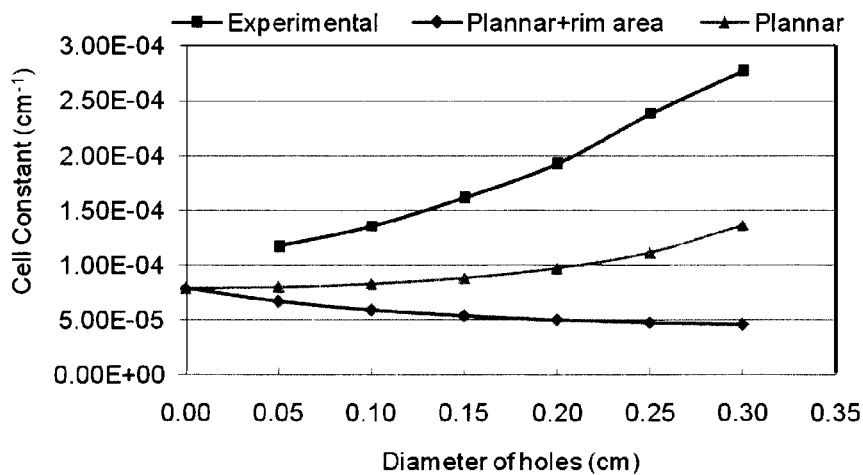
FIG. 7 is a graph showing cell constant versus hole diameter.

The experimentally determined cell constants along with the calculated cell constants for a fixed inter-electrode gap of 0.05 mm and (i) the planar surface area of the electrodes and (ii) the planar surface area of the electrode plus the perforation rim areas for varying perforation sizes are summarised in FIG. 7.

The calculated results which considered the wall area represent a lower limit of the geometrically defined cell constant. In practice only the wall area close to the electrode surface will make a significant contribution to the cell constant.

The discrepancy between the measured cell constant and the calculated values indicate that the effective resistance of the cell under the conditions of measurement was much higher than anticipated from the conductivity of the solution used. The inventors believe that there was a reactive contribution to the overall impedance of the system and this is reflected by the higher values of the cell constant. The reactive contribution had come from the capacitance resulting from the large electrode area and the narrow inter-electrode gap.

Cell Hydraulics

The inventors have identified one of the consequences of reducing the gap between electrodes as being the increased resistance to hydraulic flow when operated as a conventional electrochemical cell where flow is forced between the electrodes.

For example, to achieve a flow of 200 mL/min through a 50 micron gap between two 64 cm$^2$ electrodes would require a pressure of approximately 8.6 kPa. One of the advantages of the perforated electrode flow through configuration of the present invention is that individual flow paths from the perforations through the gap are never more than a few millimeters. A 200 mL/min flow rate through the cell with 381 perforations in an area of 64 cm$^2$ may be achieved with a pressure of 1 kPa.

The flow through the system of perforations and channels of the cell is quite similar to flow through a porous medium which is described by Darcy's law.

The measure was originally used to know how water passes through a geologic material. Hydraulic conductivity is expressed as a measure of length verses time—in the present instance this is millimeters per second. The hydraulic conductivity K was obtained by using the equations:

$$Q=Av$$

where Q is volumetric flow rate, v is the flow velocity, and A is area.

Using Darcy's Law:

$$v=Ki$$

and expressing the hydraulic gradient i as:

$$i=\frac{h}{L}$$

where h is the difference of hydraulic head over distance L, yields:

$$Q = \frac{AKh}{L}$$

Solving for K gives:

$$K = \frac{QL}{Ah}$$

Figure 8:
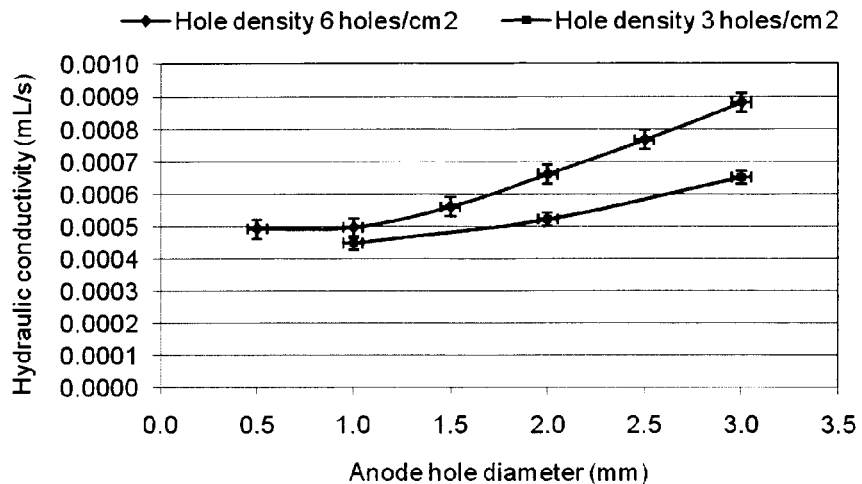
FIG. 8 is a graph showing hydraulic conductivity versus anode hole diameter.

The hydraulic conductivity calculated for the perforation density of 6 perforations/cm² assembled in the staggered configuration with increasing anode perforation diameters and hydraulic conductivity for the perforation density of 3 perforations/cm² in the staggered configuration with increasing perforation diameters on both electrodes are given in FIG. 8.

The results indicate that hydraulic conductivity increased with perforation diameter and with perforation density. When the perforation diameter is increased the width of the flow path through the gap between the electrodes is also increased and as a result the resistance to flow is reduced. The inventors have identified that increasing the perforation diameter will have the effect of reducing the path length between the perforations for a given perforation density.

Pressure versus Flow Rate

Figure 9:
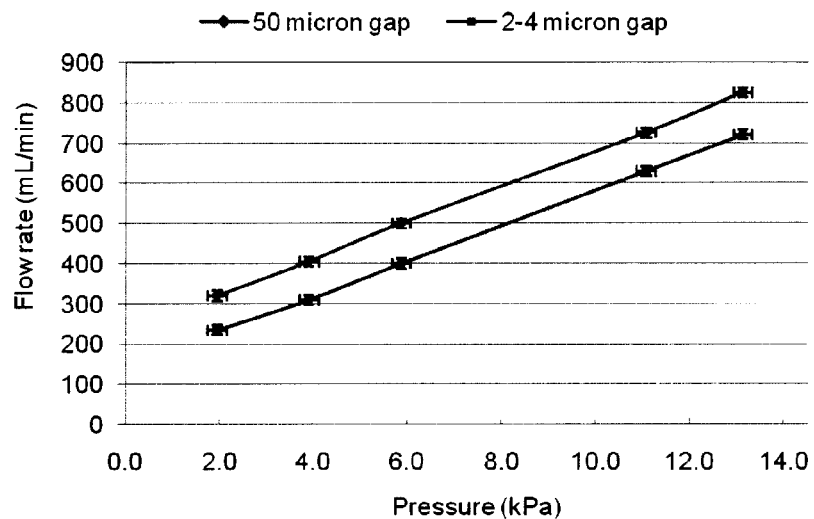
FIG. 9 is a graph showing flow rate versus pressure.

The appropriateness of using Darcy's Law to describe the hydrodynamic of the perforated electrode flow through cell of the present invention was confirmed by investigating flow as a function of hydrostatic head. Two flow gaps (50 μm and 2~4 μm) were used in a cell having 1 mm perforations with a perforation density of 6 perforations/cm². The results are summarised in FIG. 9.

The linear increase in flow rate with pressure is consistent with Darcy's law. Reducing the flow gap from 50 microns to 2-4 microns reduced the overall hydraulic conductivity by approximately 100 mL/min, at a given pressure. It may be seen that hydraulic conductivity is not reduced in proportion to the reduction in gap width. As the flow path across the electrode surfaces is not constrained, it will broaden as the gap becomes smaller so there will be less overall resistance to flow.

Flow Direction

Figure 10:
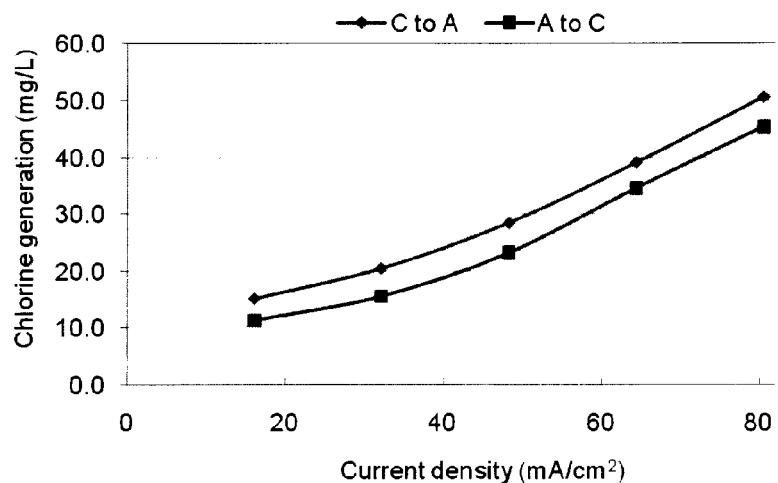
FIG. 10 is a graph showing chlorine generation versus current density.

In order to test whether there would be an effect of flow direction on the electrooxidation of chloride ions, an experiment was performed in which flows were from cathode to anode and anode to cathode. The results are given in FIG. 10 for an experimental setup having a flow rate of 190 mL/min, perforations aligned, 3 perforations/cm², and 1 mm perforations.

The results show that flow direction has an important effect on chlorine generation efficiency. More chlorine was produced when the flow was from cathode to anode. The average current efficiency (CE) for the cathode to anode flow direction was 9% which was 2% higher than the average anode to cathode flow. The average energy consumption (EC) for cathode to anode flow direction was 40 kWh/kg of chlorine compared to the average EC for anode to cathode flow of 50 kWh/kg of chlorine. The proportional increase in current efficiency is matched by a corresponding decrease in energy consumption.

The inventors consider that this effect can be understood by the likelihood of chlorine reduction if the flow direction is such that the oxidised chlorine flows pass the cathode where reduction back to chloride ions could occur. If the electrochemical reaction involved was a reduction process, then by similar reasoning the expected optimum flow direction would be from anode to cathode.

Electroporation Capabilities

As well as electro-chlorination, the inventors have identified that the cell of the present application has a synergistic effect in terms of microbial inactivation due to the chlorine generation acting in conjunction with electroporation capabilities of the high electric fields generated by the cell at low voltages—achievable due to the micrometer dimension of the inter-electrode gap.

Chemicals, Microorganism and Microbiological Analysis

Low concentrations of chloride solutions (0-500 mg/L) to represent chloride levels in natural waters were prepared using de-ionised double distilled water and NaCl (BDH analar) salt. The $Na_2SO_4$ electrolyte was BDH analar grade chemical dissolved in de-ionised water, and the calcium hypochlorite used was a BDH laboratory grade. The prepared electrolyte solutions and all glassware used were autoclaved at 121° C. for 15 minutes. The bacteria *Escherichia coli* a teaching strain at the University of Waikato microbiology department derived from K12 strain were spiked at an initial concentration of $4 \times 10^6$ CFU/mL (Colony Forming Units). The *Escherichia coli* was cultivated over night on a shaker in a water bath using a nutrient broth (meat extract 1.0 g/L, yeast extract 2.0 g/L, Peptone 5.0 g/L, Sodium chloride 5.0 g/L) culture medium at 37° C.; and the pH was 7.4. Each mL of bacterial suspension contained $2 \times 10^9$ CFU. The plate count technique was used to detect the survival cell counts after treatment. Appropriate dilutions of the bacterial cells were used to inoculate nutrient agar (Lab M) plates. Inoculated plates then incubated at 35° C. for 24 h. The survival number of cells after the treatment was determined by counting the number of colonies developed after incubation and multiplying it with the dilution factor. The log values of the ratio of number of cells survived after treatment and initially inoculated to the sample is reported as the log survival fraction.

Experimental Procedure

The *E. coli* spiked dilute electrolyte solution was passed once through the electrolytic cell at a constant flow rate and the treated samples were collected from the anodic end into a sterilized sample bottle. After 30 minutes 1.0 mL of 0.1M $Na_2S_2O_3$ was added to impede action of the oxidation species and microbial analyses carried out. The initial microbial count was maintained at $4 \times 10^6$ CFU/mL in all experiments, pH at 6.0 and temperature at 20° C. The flow rate through the cell was maintained at 190 ml/min in all experiments except when it was the variable. The disinfection capabilities of electrolyte concentrations, current densities, flow rates, different electrolytes and effect of electric fields were studied.

The experiment comparing electrochemical disinfection and chemical disinfection was studies at two current densities 16 mA/cm² and 31 mA/cm² with a water sample containing 100 mg/L of NaCl. The electrolysed sample at the two current densities produced 0.20 mg/L and 0.40 mg/L of available chlorine respectively. A stock solution of chlorine was prepared by diluting a freshly prepared calcium hypochlorite. The available chlorine was determined by an iodometric titration. A calculated volume of the diluted chlorine solution was added to the *E. coli* spiked water samples, giving available chlorine concentrations of 0.20 and 0.40 mg/L, stirred and allowed to stand for 30 minutes before they were analysed for residual microbial activity.

When comparing the disinfection capabilities of other oxidative species, the chloride free water sample was inoculated with an *E. coli* sample prepared by a special chloride free SK culture medium (KH$_2$PO$_4$—0.78 g, K$_2$HPO$_4$—2.3 g, (NH$_4$)$_2$SO$_4$—1.0 g, MgSO$_4$.7H$_2$O—0.1 g, Sodium citrate dihydrate—0.6 g, Glucose—2.0 g, Water 1 L, pH 7.3).

The nutrient broth culture of *E. coli* which contains 10 mg/L of chlorides was used for experiments on the electric field effect on microbial inactivation. Increasing electric field strengths were generated by varying the applied voltages at a constant current density by adjusting the conductivity of the electrolyte using Na$_2$SO$_4$.

Electro-Disinfection at Drinking Water Chloride Concentrations

Figure 11:
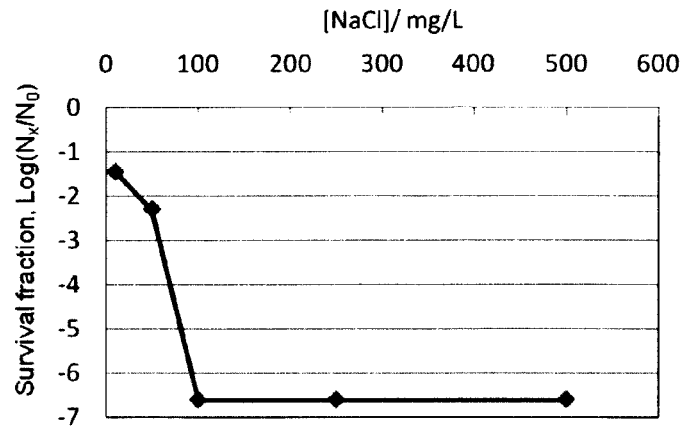
FIG. 11 is a graph showing survival fraction versus chlorine ion concentration.

Electrochemical disinfection at drinking water concentrations of chloride ion after single pass through the cell is given in FIG. 11. Total inactivation (6.6 log inactivation) of microbes at a current density of 80 mA/cm$^2$ was achieved at a chloride ion concentrations of 100 mg/L which represents the lower end of chloride concentration found in natural waters. Even in the distilled water system a 1.5 log inactivation was achieved. This result underlines the sensitivity of the experiment to the very low concentrations of chloride (10 mg/L) introduced with the *E. coli* culture medium.

In order to determine the minimum amount of chlorine generation required for 6 log inactivation, the effect of current density on disinfection at 100 mg/L chloride was investigated.

Effect of Current Density on Microbial Inactivation

Figure 12:
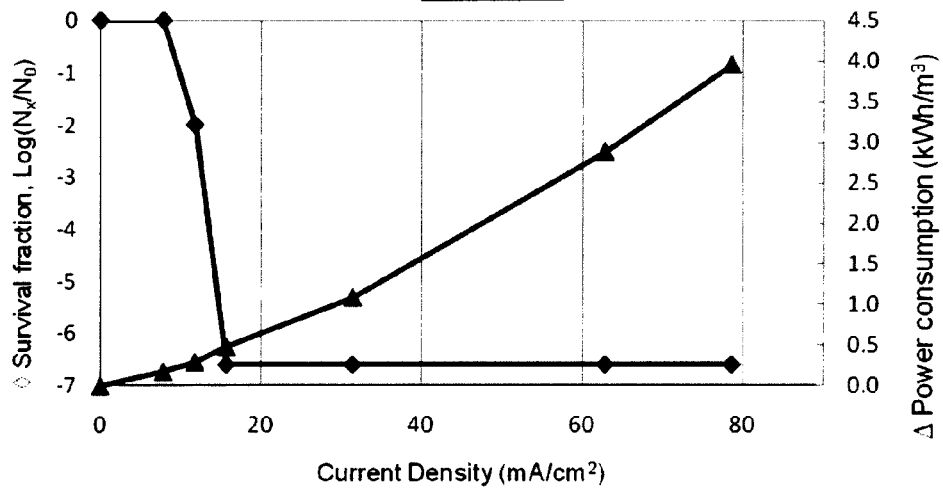
FIG. 12 is a graph showing survival fraction and power consumption versus current density.

Results for the effect of current density on inactivation along with power consumption at 100 mg/L chloride concentration are summarised in FIG. 12. The lowest current density required to achieve complete inactivation was 16 mA/cm$^2$ and the corresponding power consumption was 0.5 kWh/m$^3$ of water treated.

Effect of Flow Rate on Microbial Inactivation

Figure 13:
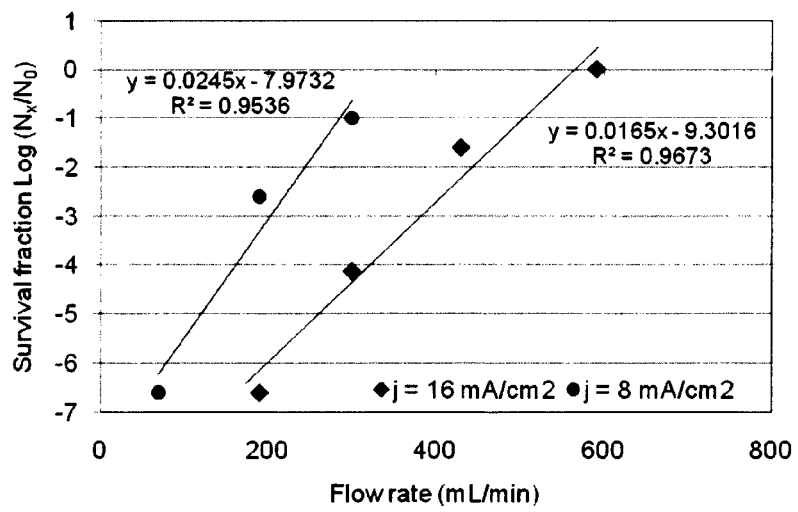
FIG. 13 is a graph showing survival fraction versus flow rate.

At a chloride ion concentration of 100 mg/L the optimum current density was found to be 16 mA/cm$^2$. These conditions were used to study the effect of flow rate on disinfection efficiency, with results given in FIG. 13. The survival fraction increased almost linearly with flow rate over at least four order of magnitude of log(N$_x$/N$_0$) consistent with active chlorine dilution at the higher flow rates and Chick-Watson relationship for the constant contact times employed. The effect of reduced disinfection at increased flow rates can be compensated by increasing current density due to the linear relationship between chlorine production and current density in the cell of the present invention.

Performance of Chlorine Produced Electrochemically

An experiment was designed to compare electrochemical disinfection with chemical disinfection at electrical field strengths lower than what are believed to cause irreversible electroporation. Two current densities, 16 and 31 mA/cm$^2$ at electric field of 1.10 kV/cm and 1.25 kV/cm (see FIG. 12) where complete inactivation was achieved were selected. The active chlorine generated under these conditions were found to be 0.20 and 0.40 mg/L respectively and the equivalent amount of active chlorine was added as to a fresh bacterial suspension as calcium hypochlorite maintaining constant pH of 6.0.

Figure 14:
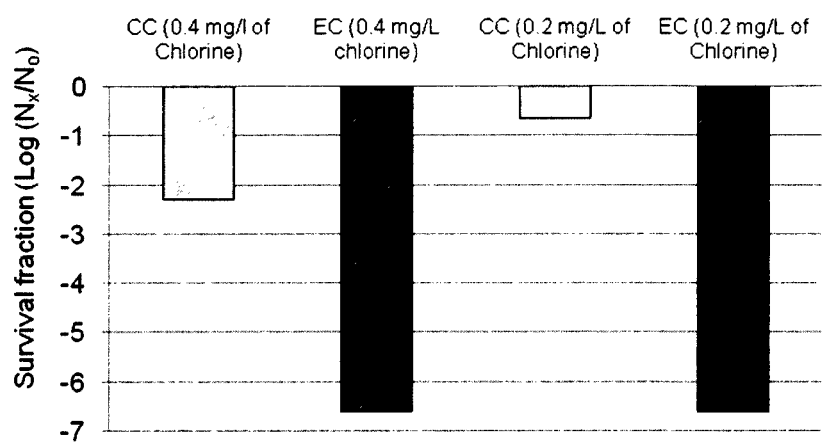
FIG. 14 is a graph showing survival fraction versus chemical and electrochemical treatment.

FIG. 14 shows a comparison of disinfection capabilities of electrochemical (EC) and chemical treatment (CC) of water at equivalent amount of chlorine generated/dosed. These results show that while the chlorine produced electrochemically achieved at least 6 log inactivation and corresponding, chlorine added as hypochlorite achieved less than 1 log inactivation at 0.2 mg/L active chlorine and approximately 2 log inactivation at 0.4 mg/L. In general, a minimum dosage of around 4.0 mg/L is required to disinfect drinking water. In the past this higher inactivation obtained by chlorine produced during electro-disinfection has been attributed to simultaneous formation of reactive oxygen species (ROSs) during the electrochemical process.

Examination of the Role of Reactive Oxygen Species (ROS)

In order to test for a role of ROS species in the absence of chloride species an experiment was performed where chloride ions was rigorously exclude from the system and ionic strength was controlled by sodium sulphate. Field strengths were arranged to be lower than that at which irreversible electroporation effects are believed to be important. The experiment used a current density 63 mA/cm$^2$, single pass through the cell, initial *E. coli* concentration N$_0$=4×10$^6$, pH 6.0 and temperature 20° C. The results are tabulated in table 1.

TABLE 1

| Sample | [NaCl]/mg/L | [Na$_2$SO$_4$]/mg/L | E'Field/kV/cm | % Inactivation |
|---|---|---|---|---|
| A | 100 | 0 | 1.65 | 100 |
| B | 10 | 0 | 1.85 | 96.5 |
| C | 10 | 100 | 1.80 | 0 |
| D | 0 | 100 | 1.80 | 0 |

The results show that inactivation in the presence of chloride is much more effective than when sulphate and no chloride is present. There is no evidence that sulphate derived oxidation products contribute to disinfection under the conditions of the experiment. Furthermore, sample C demonstrates that the presence of sulphate has an inhibitory effect on disinfection when chloride is present. This was presumably due to competition by the higher concentration of sulphate ion in the anodic oxidation processes.

These results indicate that the role of ROS species formed in the absence of chloride in electro-disinfection is insignificant under the conditions of the experiments. Most of the reported work on chloride free electro-disinfection with Na$_2$SO$_4$ as the electrolyte used prolonged exposures (several minutes) at the anode surface in a static systems or prolonged recycling through flow system in order to allow the adequate exposure of the bacteria to short lived ROS species. Such treatment times are incompatible with practical disinfection requiring large flow rates. The effectiveness at short exposure times and the possibility of residual protection are major advantages of electro-disinfection in the presence of chloride.

ROSs produced from sulphate do not appear to contribute to disinfection under the conditions of the experiments conducted using the present invention. The electric fields generated, while being less than required for irreversible electroporation were still much higher than other reported studies of electro-disinfection. The contribution of the field is discussed below.

Synergistic Electric Field Effects

The 50 µm gap of the cell of the present invention allows high fields to be produced at low applied voltages, constant current density and constant chloride concentration, providing conductivity is adjusted using a "inert" electrolyte such as sodium sulphate.

Figure 15:
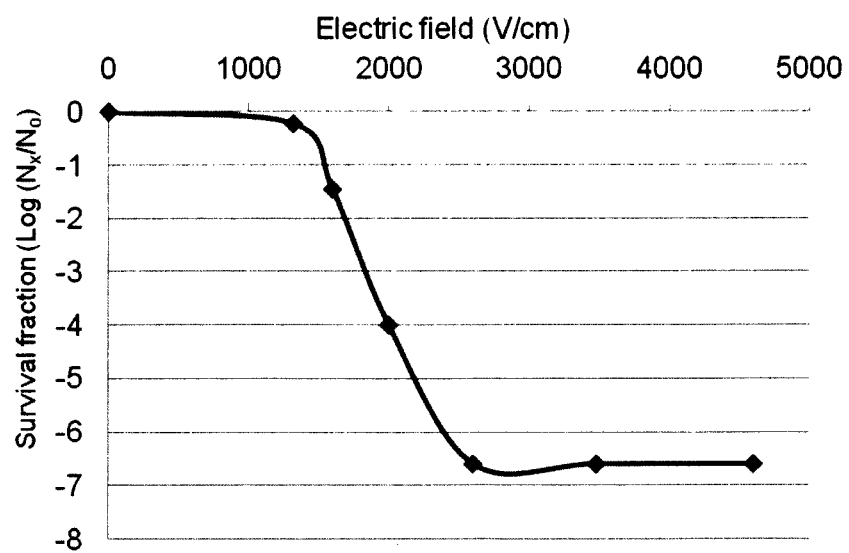
FIG. 15 is a graph showing survival fraction versus electric field.

Sodium sulphate has been shown to produce little bacterial inactivation. This feature was used to investigate disinfection at a chloride concentration of 10 mg/L where disinfection was incomplete. Results of inactivation versus field strength are plotted in FIG. 15.

The data shows a dramatic increase in inactivation above a filed strength of 1.3 kV/cm, much below the 10.0 kV/cm field strength previously reported to cause irreversible electroporation. Total inactivation was achieved at a field of 2.5 kV/cm.

The constant current density used in these experiments means that the concentration of electrolytically generated disinfectant species would have remained constant. The inventors consider that this provides evidence that the effectiveness of the low and inadequate concentration of electrolytically produced disinfectant species formed at 10 mg/L chloride is sufficiently enhanced at a field of 2.5 k V/cm to achieve complete inactivation.

Inactivation of microbes is triggered when chlorine species diffuse through the cell wall causing impairment of functioning in the internal enzyme system. Studies on electroporation have confirmed that long pulses of electric fields above 1.0 kV/cm typically cause reversible cell damage. In the present invention, field exposures of the solution to field pulses of 0.1 seconds duration were produced hydro dynamically by flow through the cell. As such, the synergy between electric field and electrolytically produced active chlorine species has been demonstrated.

The reduction of the inter-electrode gap to 50 μm in the cell of the present invention has allowed a water treatment cell to achieve effective disinfection at very low chloride concentrations and relatively low power consumption.

In addition, the direction of flow and hydrodynamics offer advantages in the disinfection process. Flow direction from cathode to anode minimises the possibility of cathodic reduction of the electrolytically produced oxidation products that are effective in the disinfection.

The short residence time in the cell gives little opportunity for the further oxidation of active chlorine species to higher oxidation states such as chlorite, chlorate and perchlorate ions. These ions are considered to be detrimental disinfection by-products.

Forcing the water through the micro-gap between electrodes results in high flow velocities, high Reynold's numbers, high turbulence and hence rapid and complete mixing of the disinfectant species.

Insulating Layer

Figure 16:
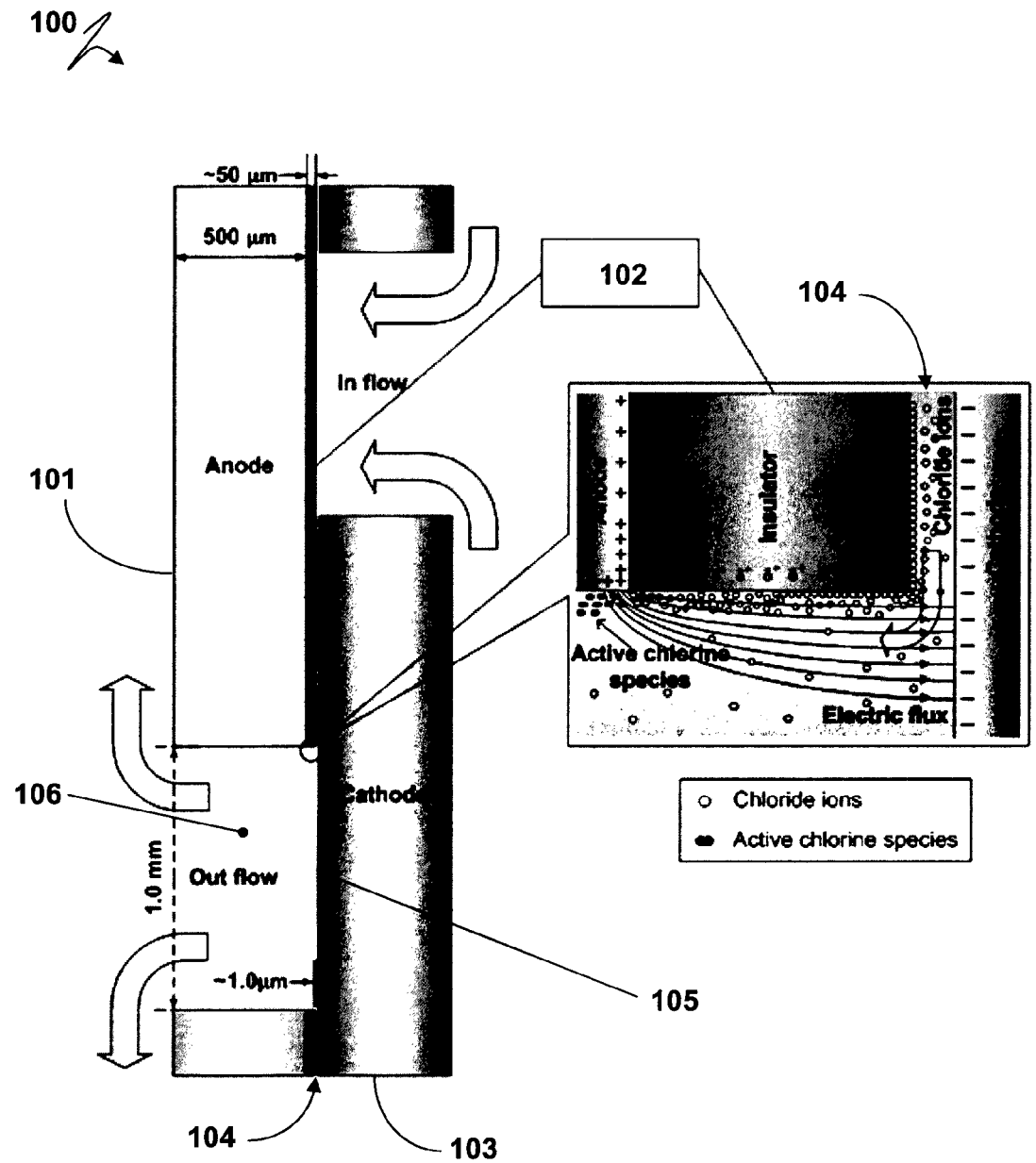
FIG. 16 illustrates operation of an electrolytic cell according to another embodiment of the present invention.

FIG. 16 illustrates a further embodiment of an electrolytic cell (100), generally configured in the manner of that illustrated by FIG. 1.

The anode (101) is coated with an insulating film (102) of 50 μm polyurethane, which prevents the solution to be electrolysed from contacting the anode surface.

The anode (101) and cathode (103) are clamped together with no spacer, and the solution to be electrolysed forced through a gap (104) of ≈1 μm between the exposed cathode (103) and the insulated anode (101). Electrical contact is made between the bare cathode surface (105) and the metal surfaces of the exposed rims of the perforations (106) in the insulated anode (101).

Insulating Layer—Electrolysis of Dilute Sodium Chloride Solutions

The electroactive species of interest are the chloride ions of a series of dilute NaCl solutions (0.85 mM-17 mM). The sodium chloride solutions were prepared by dissolving NaCl (BDH Analar reagent) in de-ionized water (conductivity <2 μS cm$^{-1}$). Chlorine was determined by an iodometric titration. Sodium iodide 10% solution (BDH Analar Reagent), sodium thiosulfate (BDH Analar Reagent) made up to concentrations of 0.25 M, glacial acetic acid (BDH Laboratory Reagent), and starch indicator (BDH Analar Reagent) were used as required. To avoid the escape of chlorine the electrolyzed solution was collected into a known volume of 10% sodium iodide. The samples were immediately titrated against the standardized thiosulfate.

The chlorine current efficiency was calculated using the equation:

$$CE = \frac{Q_P}{\Sigma Q} \times 100\%$$

where CE=current efficiency,
$Q_P$=charge used forming the product,
$\Sigma_Q$=total charge consumed=I t, (where I is current and t is time)

The charge used forming the product was calculated using Faraday Equation:

$Q_P = NnF$ where
N=number of product moles formed in time t,
n=number of electrons transferred per mole,
F=Faraday constant.

Power efficiency or power consumption (PC) for chlorine production (specific electrical energy consumption) is the electrical energy in kilowatt hours (kWh) required to produce one kilogram of chlorine and was calculated using the equation:

$$PC = \frac{EI}{qc_{Cl_2}M_{Cl_2}}$$

where
E=voltage
q=volumetric flow rate
$c_{Cl_2}$ concentration of chlorine produced
$M_{Cl_2}$=molecular weight of $Cl_2$ Electrolysis of water in the solution is inhibited because most of the anode (101) is insulated. However, being positively charged with induced charge, the insulating layer (102) on the anode (101) will still attract chloride anions. These will concentrate in the layer (102) and be swept to the perforation (106) under the influence of the hydraulic flow in that direction and under the influence of the field at the perimeter of the perforation (106).

As soon as contact is made with the exposed inner surface of the perforation (106) of the anode (101) they will be discharged to form chlorine gas. Further anions will then migrate to the perforation (105). In this way chloride ions will be selectively discharged in preference to the electrolysis of water. Chlorine production will be maximised when chloride ions migrate to the perforation (106) rim at the rate at which they are attracted to the charged but insulated anode (101).

Figure 17:
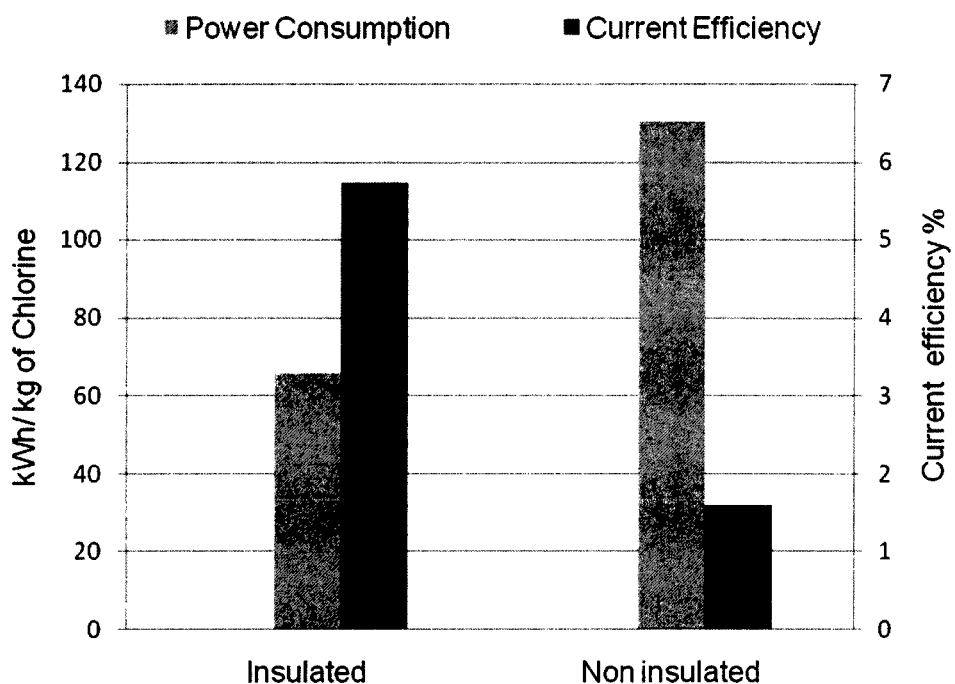
FIG. 17 is a graph showing power consumption and current efficiency for two embodiments of the cell of the present invention.

FIG. 17 summarises data showing improved current efficiency and reduced power consumption that were obtained when the surface of the anode of the cell (100) was insulated. At a current density of 2 mA cm$^{-2}$, current efficiency was more than tripled and power consumption was reduced by a factor of 2.

This result confirms that improved electrolytic performance at low electrolyte concentration might be achieved inhibiting water electrolysis by partially insulating one of the electrodes. The fact that insulating the planar anode surface area caused the cell resistance to increase from 5 to only 50 ohms (much less than the proportional decrease in exposed anode area) indicated an enhanced conducting path to the exposed rims or walls of the anode perforations. To further investigate this possibility, experiments were performed to test the effect of electrolyte concentration, current density and perforation density.

Insulating Layer—Effect of Electrolyte Concentration

Figure 18:
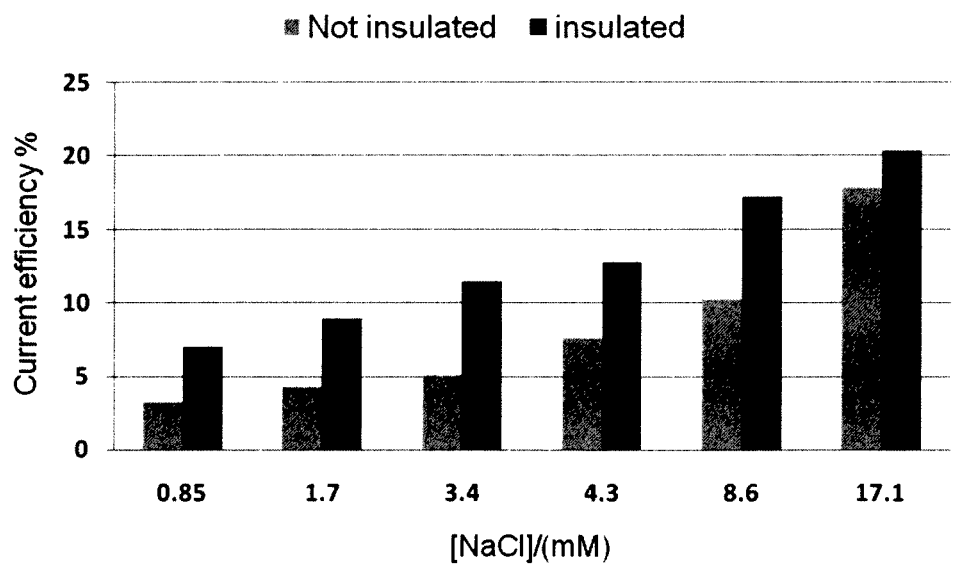
FIG. 18 is a graph showing current efficiency versus sodium chloride concentration.

FIG. 18 shows that as sodium chloride concentration was increased, the current efficiency of both the insulated and non insulated electrodes increased but the difference between the two systems decreased at concentrations above 3.4 mM. This indicated the likelihood that transport effects were involved.

Insulating Layer—Effect of Current Density

Figure 19:
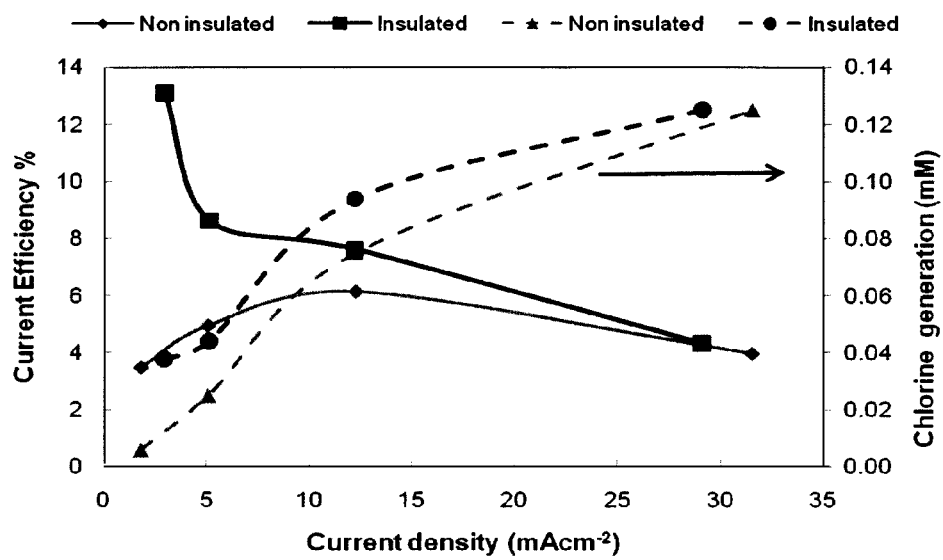
FIG. 19 is a graph showing current efficiency and chlorine generation versus current density.

The effect of increased current density on current efficiency and chlorine generation at the sodium chloride concentration of 1.7 mM for the insulated and non insulated electrodes shown in FIG. 19 adds further support for transport effects being important. The effect is largest at low current densities where transport of chloride to the exposed anode surface is most likely to be a limiting factor. The inventors have identified that the insulating film exerts an influence on the availability of chloride ions at the anode that is absent from a non insulated electrode.

Insulating Layer—Effect of Perforation Density

The initial experiments were performed using a partially insulated anode with 6 perforations/cm$^2$. The effect of perforation density was investigated by reducing this to 3 perforations/cm$^2$.

Figure 20:
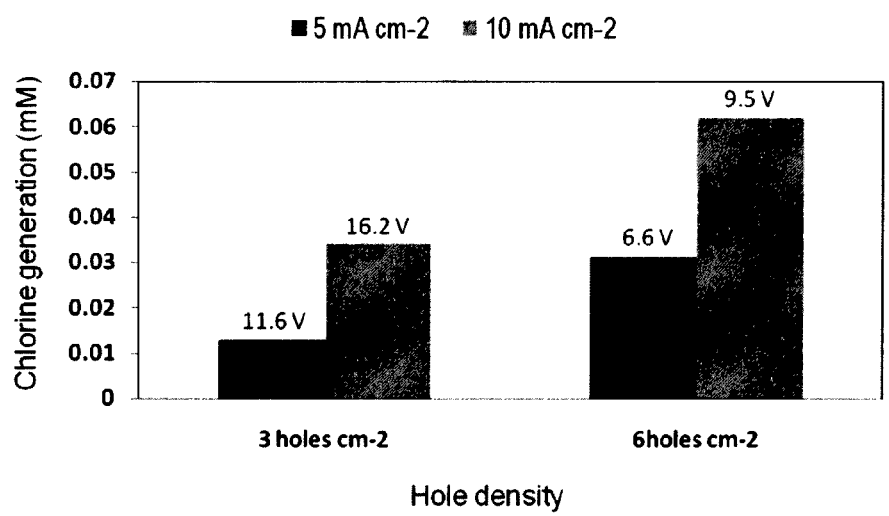
FIG. 20 is a graph showing chlorine generation versus hole density.

FIG. 20 shows that at the two current densities used, the chlorine generation (and hence current efficiency) at 6 perforation/cm$^2$ was approximately twice that at 3 perforations/cm$^2$ i.e. chlorine production and current efficiency increased linearly with perforation density.

In addition, the voltage required for a given current density decreased in inverse proportion to the perforation density. This result indicates that each perforation has an associated conducting path such that the increase in perforation density is equivalent to adding conductors in parallel.

The improved current efficiency at dilute electrolyte concentrations that has been achieved by the partial insulation of closely spaced perforated electrodes has been identified as being related to the perforation density. This effect has been explained by the inventors as the provision of a conducting path across the cylindrical surface of the capillary perforations resulting from mobile chloride ion adsorption into the double layer resulting from the induced charge at the electrolyte/insulator surface as is illustrated diagrammatically in FIG. 16.

The reduced boundary layer thickness at the walls of the capillaries relative to the planar surface of the electrode, the mobility of chloride ions adsorbed into the double layer and the high field associated with the exposed rim of the metallic electrode can account for the delivery of an increased concentration of chloride ions at a rate that allows preferential discharge of chloride relative to water molecules.

A practical illustration of the usefulness of the effect is provided by data for electro-chlorine generation for disinfection. Chlorine generation in the cell with non insulated electrodes (6 perforation/cm$^2$, 5 volts, 1.7 mM NaCl, flow rate of 3.2 mL s$^{-1}$) was 0.13 mM at 95 kWh/kg of chlorine. The same chlorine production produced under the same conditions but using the insulated electrode system with 12 perforations could be expected to be achieved at 17.3 kWh/kg of chlorine (assuming that linear increase in current efficiency and linear reduction in resistance with perforation density is maintained when perforation density is increased for 6 to 12 perforation/cm$^2$).

Electrochemical Degradation of Textile Dyes

In addition to disinfection or microbial inactivation, the present invention may have particular application to the decolourisation of dyes. Electrochemically produced active chlorine and other short lived oxidizing species break down the chromophores of organic dye molecules and further oxidise them to complete mineralisation.

To date, the major drawback of electrochemical treatment of textile effluents has been the higher energy consumption. The capacity of the cell of the present invention to produce chlorine at much reduced energy consumption makes the commercial possibility of electro decolourisation more achievable.

This was tested using the electrolytic cell of FIG. 1, having 1.0 mm perforations with 6 perforations/cm$^2$ perforation density in a hexagonally arranged, staggered perforation configuration.

Figure 21:
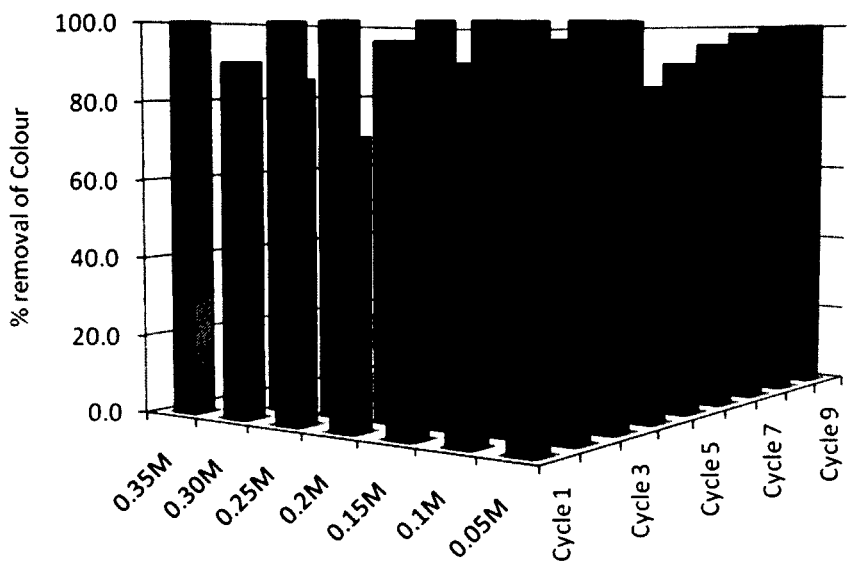
FIG. 21 is a graph showing the effects of increasing NaCl concentration on dye colour removal with the number of cycles through an electrolytic cell according to an embodiment of the present invention.
Figure 22:
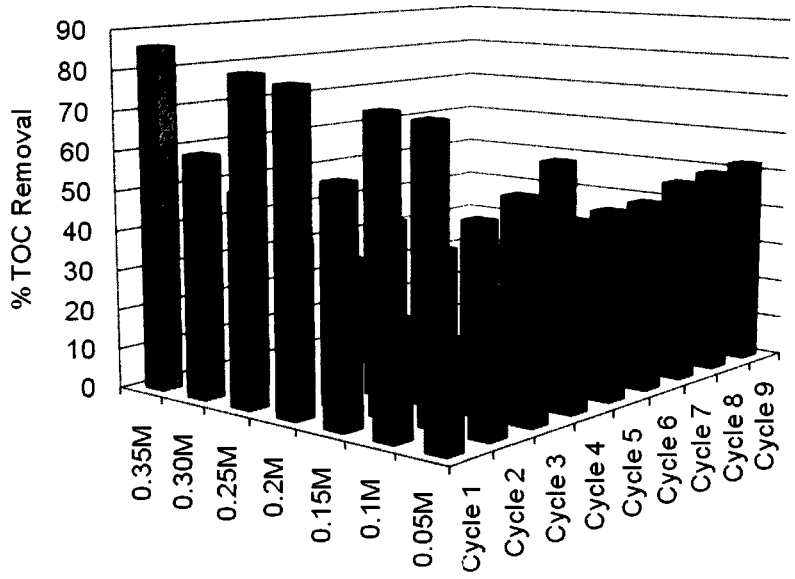
FIG. 22 is a graph showing the effects of increasing NaCl concentration on total organic carbon (TOC) removal with the number of cycles through an electrolytic cell according to an embodiment of the present invention.

The effects of increasing NaCl concentration on indigo carmine dye colour removal and total organic carbon (TOC) removal with the number of cycles through the PEFT cell are summarised in FIGS. 21 and 22 respectively. Indigo Carmine (IC) Dye is one of the initial forms of naturally derived organic dyestuff (Vat dye). It is used in dyeing cotton fabrics, especially in the denim (blue jeans) production; generally know as the denim dye.

Maximum removal of both dye and TOC was achieved under the conditions favoring maximum chlorine production (i.e. maximum chloride ion concentration at the current density used). Removal of colour was 100% after a single cycle through the cell at 0.35 mol/L of NaCl, simultaneously removing 85% of the TOC in the synthetic dye solution.

It is envisaged that the flow through configuration of the cell will lend itself well to a cyclic treatment of the fluid.

The Effect of Post Electrolysis Stand Time on Colour Removal

Figure 23:
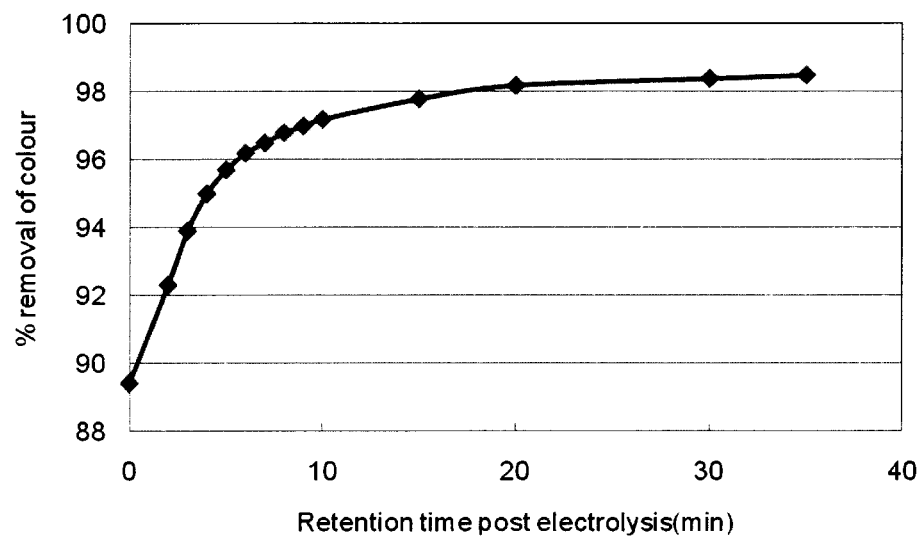
FIG. 23 is graph showing removal of colour versus retention time after electrolysis.

It was observed that dye solutions continued to fade with prolonged standing times. This effect was studied by allowing a solution of treated Reactive blue 2 (RB2) dye to stand for a period of 35 minutes after electrolytic treatment. (RB2) dye is an anthraquinone based reactive dye mostly used with cellulosic fabrics. Results are plotted in FIG. 23 for a single pass, flow rate of 190 mL/min, pH 7.5, current density 47 mA/cm$^2$, temperature 20° C., NaCl conc. 0.05 mol/L and RB2 dye conc. 100 mg/L.

Approximately 89.5% of the colour was removed by a single pass through the cell. On standing a further 8% of colour removal was observed. The colour removal rate on standing diminished after 20 minutes. A precipitate formed in the treated dye solutions after a period of several days and total colour removal was observed. It could be that the slow colour removal observed in the present experiment was a result of slow aggregation processes.

A possible application of this result could be providing adequate retention time for the slower processes to go to completion allowing an energy saving due lower chlorine requirements and/or better quality final discharge.

Aspects of the present invention have been described by way of example only and it should be appreciated that modifications and additions may be made thereto without departing from the scope thereof as defined in the appended claims.

What we claim is:

1. An electrolytic cell, comprising:
    at least two electrodes, each electrode comprising:
        a first and a second surface; and
        a number of perforations arranged in a substantially uniform pattern;
    wherein the electrodes are positioned relative to each other such that:
        at least one surface of each electrode is opposed to a surface of the other electrode, and
        a gap is formed between the opposed surfaces of the electrodes;

at least one insulating layer positioned on the opposing surface of at least one of the electrodes, the insulating layer comprising a number of perforations aligning with the perforations of the electrode on which it is positioned, wherein the thickness of the insulating layer is less than the distance between the opposed surfaces of the electrodes, and wherein the cell is configured such that fluid flow is directed through the perforations of one electrode, between the insulating layer and the surface of the electrode opposed to the surface on which the insulating layer is positioned, and through the perforations of the other electrode.

2. An electrolytic cell as claimed in claim 1, wherein the gap is between substantially 1 to 100 micrometers.

3. An electrolytic cell as claimed in claim 1, wherein the gap is between 2 to 4 micrometers.

4. An electrolytic cell as claimed in claim 1, wherein the insulating layer is impervious to water and electroactive species.

5. An electrolytic cell as claimed in claim 1, wherein the insulating layer comprises polyurethane.

6. An electrolytic cell as claimed in claim 1, wherein the insulating layer comprises an inorganic deposit on the surface of the electrode.

7. An electrolytic cell as claimed in claim 1, wherein the thickness of the insulating layer is between 1 to 99% of the distance between the opposed surfaces of the electrodes.

8. An electrolytic cell as claimed in claim 1, wherein the cell is configured such that flow of fluid through the cell is such that electrolytic product species are formed at the electrode from which the fluid exits the cell.

9. An electrolytic cell as claimed in claim 1, wherein the perforations of each electrode are arranged in a regular pattern such that uniform flow paths are formed between the perforations of one electrode, and the perforations of the other electrode.

10. An electrolytic cell as claimed in claim 9, wherein the perforations are arranged in a hexagonal array on each electrode.

11. An electrolytic cell as claimed in claim 10, wherein the density of perforations in one electrode is greater that the density of perforations in the other electrode.

12. An electrolytic cell as claimed in claim 11, wherein the distance between the perforations in the electrode having the lower density of perforations is substantially 1.75 times the distance between the perforations in the other electrode.

13. An electrolytic cell as claimed in claim 9, wherein the perforations are arranged in a square array.

14. An electrolytic cell as claimed in claim 1, wherein the perforations of each electrode are positioned such that they are offset relative to the perforations of the other electrode.

15. An electrolytic cell as claimed in claim 1, wherein the perforations in one electrode are aligned with the perforations in the other electrode.

16. An electrolytic cell as claimed in claim 1, wherein each perforation is substantially 1 millimeter in diameter.

17. An electrolytic cell as claimed in claim 1, wherein the density of the perforations in each electrode is at least 3 perforations per square centimeter.

18. An electrolytic cell as claimed in claim 1, wherein the density of the perforations in each electrode is at least 6 perforations per square centimeter.

19. An electrolytic cell as claimed in claim 1, wherein the cell comprises any number of pairs of perforated electrodes with or without insulating films.

20. A method of treating fluid using an electrolytic cell, the cell comprising at least two electrodes, each electrode comprising a first and a second surface and a number of perforations, wherein the electrodes are positioned relative to each other such that at least one surface of each electrode is opposed to a surface of the other electrode and a gap is formed between the opposed surfaces of the electrodes, at least one insulating layer positioned on the opposing surface of at least one of the electrodes, the insulating layer comprising a number of perforations aligning with the perforations of the electrode on which it is positioned, wherein the thickness of the insulating layer is less than the distance between the opposed surfaces of the electrodes, and wherein the method comprises the steps of:
  i) passing the fluid through the perforations in one of the electrodes, between the insulating layer and the surface of the electrode opposed to the surface on which the insulating layer is positioned, and through the perforations in the other electrode; and
  ii) applying an electric current to the electrodes as the fluid passes through the cell.

21. A method as claimed in claim 20, wherein flow of fluid through the cell is such that electrolytic product species are formed at the electrode from which the fluid exits the cell.

22. A method as claimed in claim 21, wherein the electrolytic product species is chlorine, one of the electrodes is configured to act as a cathode, the other electrode is configured to act as an anode, and the fluid is first passed through the cathode.

* * * * *